United States Patent
Lee et al.

(10) Patent No.: US 6,792,532 B1
(45) Date of Patent: Sep. 14, 2004

(54) METHOD FOR ENCRYPTING DATA USING IEEE 1394 SERIAL BUS NETWORK

(75) Inventors: Seung Hyun Lee, Buchun (KR); Sung Hun Cho, Seoul (KR); Young Ki Kwon, Seoul (KR); Won Seok Cho, Suwon (KR); In Seong Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/414,780

(22) Filed: Oct. 8, 1999

(30) Foreign Application Priority Data

Oct. 10, 1998 (KR) ........................................ 1998/42417

(51) Int. Cl.$^7$ ............................ H04L 9/00; H04N 7/167
(52) U.S. Cl. ........................ 713/171; 380/202; 380/203
(58) Field of Search .......................... 713/171; 380/203, 380/202

(56) References Cited

U.S. PATENT DOCUMENTS 5,949,877 A * 9/1999 Traw et al. .................. 713/171
6,256,391 B1 * 7/2001 Ishiguro et al. ............. 380/203

* cited by examiner

Primary Examiner—Matthew Smithers
Assistant Examiner—Courtney D. Fields
(74) Attorney, Agent, or Firm—Morgan, Lewis & Bockius LLP

(57) ABSTRACT

A data encryption method for an IEEE 1394 serial bus network, a data encryption method for an IEEE 1394 serial bus network, comprising the steps of requesting a private encryption at a data transmission node using a predetermined encryption algorithm at a data receiving node; recognizing and confirming that the data transmission node set the private encryption requesting at the data receiving node; transmitting an encrypted data at the data transmission node when the receiving node requests a service at the data transmission node; and decoding the encrypted data using a predetermined unencrypting key at the data receiving node, for thereby transmitting an encryption algorithm and encryption data to a corresponding node when a service is requested from a receiving node with respect to a certain system by setting an encryption algorithm in the system and decoding an encrypted data transmitted from the system in accordance with an encryption algorithm and displaying the same, so that a certain user can use a service.

4 Claims, 4 Drawing Sheets

FIG. 6

| CODE(H) | ENCRYPTION ALGORITHM |
|---|---|
| 0000 | SHIFTING BY 1-BYTE UNIT IN LEFT DIRECTION ONETIME |
| 0001 | SHIFTING BY 1-BYTE UNIT IN LEFT DIRECTION TWO TIMES |
| 0002 | SHIFTING BY 1-BYTE UNIT IN LEFT DIRECTION THREE TIMES |
| ⋮ | ⋮ |
| 0006 | SHIFTING BY 1-BYTE UNIT IN LEFT DIRECTION SEVEN TIMES |
| 0010 | SHIFTING BY 2-BYTE UNIT IN LEFT DIRECTION ONE TIME |
| 0011 | SHIFTING BY 2-BYTE UNIT IN LEFT DIRECTION TWO TIMES |
| ⋮ | ⋮ |
| 001E | SHIFTING BY 2-BYTE UNIT IN LEFT DIRECTION FIFTEEN TIMES |
| 0100 | OTHER ENCRYPTION METHOD 1 |
| 0101 | OTHER ENCRYPTION METHOD 2 |
| 0102 | OTHER ENCRYPTION METHOD 3 |
| ⋮ | ⋮ |

METHOD FOR ENCRYPTING DATA USING IEEE 1394 SERIAL BUS NETWORK

BACKGROUND OF THE INVENTION

1. Field of the Invention

The present invention relates to an encrypting algorithm, and in particular to a data encrypting method which is capable of preventing an unauthorized user's access and wiretap by privately encrypting a certain data at the side of a data transmission using an encrypting algorithm based on an IEEE 1394 serial bus network for thereby providing a service for only an authorized system.

2. Description of the Background Art

Generally, an encryption is directed to converting a data used for a data transmission and receiving operation into a certain format which is not recognizable by an unauthorized user using a certain encryption method or by performing a certain conversion. The encryption is formed of an original data, a key for encrypting the data, and a key for decoding the encrypted data into an original data. In addition, as the above-described encryption method, there are provided a symmetrical encryption method implemented by a key for encoding a data and another key for decoding the encrypted data, and an asymmetrical encryption method which uses a public key.

In an encryption method based on a www security protocol on the network, there are provided a DES(Data Encryption Standard) in which the key of 56 bit length is divided into a 64-bit block and is processed more than 18 times and then is encrypted based on a 1-key encryption method, and a RSA encryption method which is implemented by a 2-key encryption method having different codes each used for encrypting a data and decoding the encrypted data. The RSA encryption method is directed to a 2-key encryption method having different codes each used for encrypting a data and decoding the encrypted data. When encrypting a security data, two "public keys" which are published as being receiver's are used for a data receiver, and when decoding the encrypted data, one "personal key" which is known merely to data receiver is used for decoding the encrypted data.

An encrypted data is transmitted to an opposite system using the above-described encryption method, and at the opposite side, the encrypted data is decoded or reproduced into an original data using a certain process or an encryption key.

The above-described operation will be explained in detail with reference to FIG. 1.

FIG. 1 is a view illustrating an embodiment for performing a service connection using an encryption. At the side of a transmission, a certain message is encrypted into a cryptogram by an encryption key and is stored. The cryptogram is transmitted to a certain destination system. Thereafter, the cryptogram is decoded into an original message by a certain decoding process. Namely, the thusly transmitted cryptogram is decoded into an original message by a certain decoding process at the side of the destination system, for example, using a decoding key for decoding the cryptogram. At this time, if the destination system solely has a decoding key, a receiver may receive a certain message without informing the contents of a transmission to another receiver who does not have a decoding key based on the encrypted state of the transmitter.

The processes that a certain message is encrypted and the message received at the side of the receiver is decoded, is performed in a state that a message process format is determined based on a certain standard and condition. Therefore, in the case that an unauthorized user accesses the system, an error message or an access impossible message is outputted, so that the unauthorized person can not access the system.

The IEEE 1394 standard is directed to an international standard implemented based on a high speed serial bus apparatus capable of providing an isochronous(real time) and asynchronous transmission. The digital apparatuses are connected by a high speed serial bus based on the IEEE 1394 serial bus network interface card(module). In addition, in the IEEE 1394, a communication node, a computer and home appliance are connected with a single network in a transmission technique between the digital nodes, so that it is possible to implement a multimedia data transmission and receiving operation at a high speed from 100 Mbps to 1 Gbps.

In addition, an IEEE 1394 cable is used for a data interface based on a high bandwidth and is thinner compared to other cables. When a peripheral node connected by the IEEE 1394 cable is in an active state, a multimedia operation characteristic capable of adding or removing a new digital node is possible.

As described above, the IEEE 1394 standard has a high transmission speed and bidirectional communication characteristic. Namely, the IEEE 1394 standard is capable of processing a data at three transmission speeds of 98.304 Mbps, 196.608 Mbps and 393.216 Mbps in accordance with a transmission mode. Therefore, it is possible to effectively transmit a digital audio signal or a motion picture information. A connection with a multimedia peripheral node such as a scanner, a digital camera, a digital video camera, etc. may be possible. since the above-described three transmission speeds are available for other transmission speeds, the 393.216 Mbps transmission mode support both 98.304 Mbps and 196.608 Mbps. In addition, since a bidirectional communication function is excellent, the peripheral system (hereinafter called as a node) having the IEEE 1394 serial bus network interface card(module) is available for a data transmission and receiving operation in a multimedia application field for a video conference using a computer.

FIG. 2 is a view illustrating a state that a plurality of nodes are connected based on a known IEEE 1394 serial bus network. As shown therein, there is provided an IEEE 1394 serial bus network interface card(module)(not shown) for each node for transmitting a data outputted from a certain node to another node for thereby recording or displaying the same. Namely, there are provided an audio system 200, a digital TV 202, a set-top box 204, a computer 206, a printer 208, a scanner 210, and a digital video disk ROM(DVD-ROM) 212 which are interconnected by a bus connection technique of a point-to-point method.

In the above-described structure, if a certain node is disconnected from the IEEE 1394 cable or another node is connected to the same, an IEEE 1394 bus reset operation is performed and initialized. In the initial step, an existing information which is being processed between nodes connected by the IEEE 1394 cable is initialized. Each node is provided with a physical address. Thereafter, the IEEE 1394 interface becomes a standby state for a normal operation.

The IEEE 1394 interface is directed to a method for transmitting data and supports an isochronous(real time) and asynchronous transmission.

In the asynchronous transmission mode, a data and a hierarchical information are transmitted using an address, and in the asynchronous transmission mode, when transmitting data, a channel number is transmitted without using the address. For example, the isochronous transmission mode is used for transmitting a multimedia information which has a time-based limit like a motion picture or audio data, and the asynchronous transmission mode is used for transmitting an information used for a certain apparatus which is not operated in real time such as a printer 108 or a scanner 110. In addition, each node receives a protocol supported by the node when transmitting a certain data. For example, an AV/C protocol is adapted to the audio system 100, the digital TV 102, etc., and the CD-ROM/DVD-ROM 112 is capable of transmitting a data based on a SBP-2(Serial Bus Protocol-2). In addition, the protocol adapted to the printer 108 is used for transmitting a certain data based on the DP protocol. These protocols are separated from each other by a 1-bit flag and are stored in a protocol packet data provided to each node.

In the data transmission at each node in the isochronous and asynchronous transmission modes based on a connection with the IEEE 1394 cable, a protocol identification packet data is transmitted to the network and is formed to another node, so that the data is transmitted and received with respect to the node having the same protocol.

In the above-described conventional IEEE 1394 serial bus network, there is not a function for providing a detail access method with respect to itself information which is changed at each time when a certain data is transmitted from the transmission side to a receiving side.

SUMMARY OF THE INVENTION

Accordingly, it is an object of the present invention to provide a data encryption method which is capable of transmitting an encryption algorithm and encryption data to a corresponding node when a service is requested from a certain node with respect to a certain system by setting an encryption algorithm in the system and decoding an encrypted data transmitted from the system in accordance with an encryption algorithm and displaying the same, so that a certain user can use a service.

To achieve the above objects, there is provided a data encryption method on an IEEE 1394 serial bus network, which includes the steps of requesting a private encryption at a data transmission side node using a previously set encryption algorithm at a certain node, recognizing and checking whether the data transmission side node set an encryption at a certain node, transmitting an encrypted data at the data transmission side node when a certain node requests a service at the data transmission side node, and decoding the encrypted data using a decoding key at a certain node for a normal use of the data.

In the above-described method, the encryption setting operation may be performed by a bit padding method.

In addition, in the above-described method, the node of the data transmission side may request a password input based on an encryption algorithm, and when a password is not properly inputted, a service invalid message is displayed on a certain node.

In the above-described method, in a state that an encryption is set at the data transmission side node by a certain node, when setting an encryption at the data transmission side node by another node, an encryption deny message may be displayed on another node.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a table illustrating an example of the encryption algorithm.

DETAILED DESCRIPTION OF THE PREFERRED EMBODIMENTS

Figure 1:
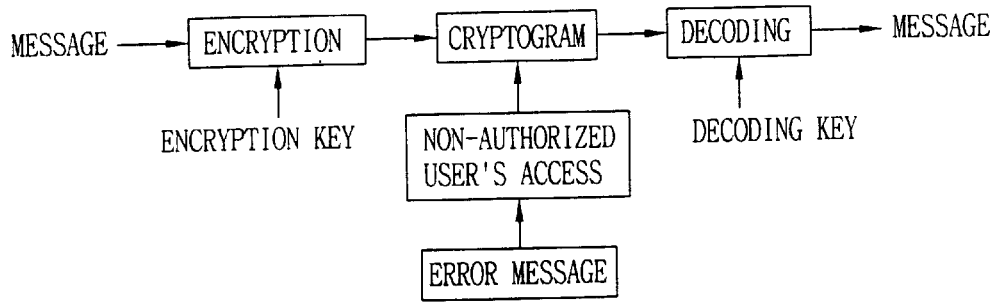
FIG. 1 is a view illustrating a conventional example for performing a service access using an encryption.
Figure 2:
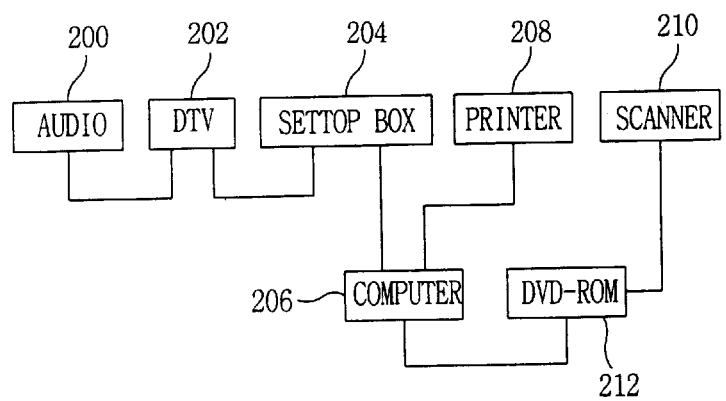
FIG. 2 is a view illustrating a state that a plurality of nodes are connected each other in accordance with a known IEEE 1394 transmission standard.
Figure 3:
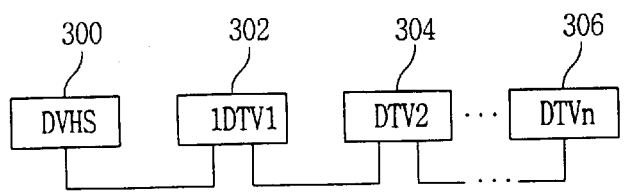
FIG. 3 is a view illustrating a state that a plurality of systems are connected each other in accordance with a known IEEE 1394 transmission standard.

FIG. 3 is a view illustrating an embodiment that a plurality of systems are connected each other in accordance with a known IEEE 1394 serial bus network. As shown therein, a certain image information outputted from a digital video home system(DVSH) 300 is applied to a first through n-th digital televisions DTV302, DTV304, DTV306, . . . , and is displayed. The above-described digital televisions are connected by an IEEE 1394 cable by a point-to-point connection method based on a two-point connection method. In addition, an input and output module(not shown) is provided at a DVHS 300 and each of DTV302, 304 and 306 for implementing an input/output operation of the video signal. The data transmission process for transmitting a data based on an encryption between the connected DVHS and DTV by the IEEE 1394 cable will be explained.

Figure 4:
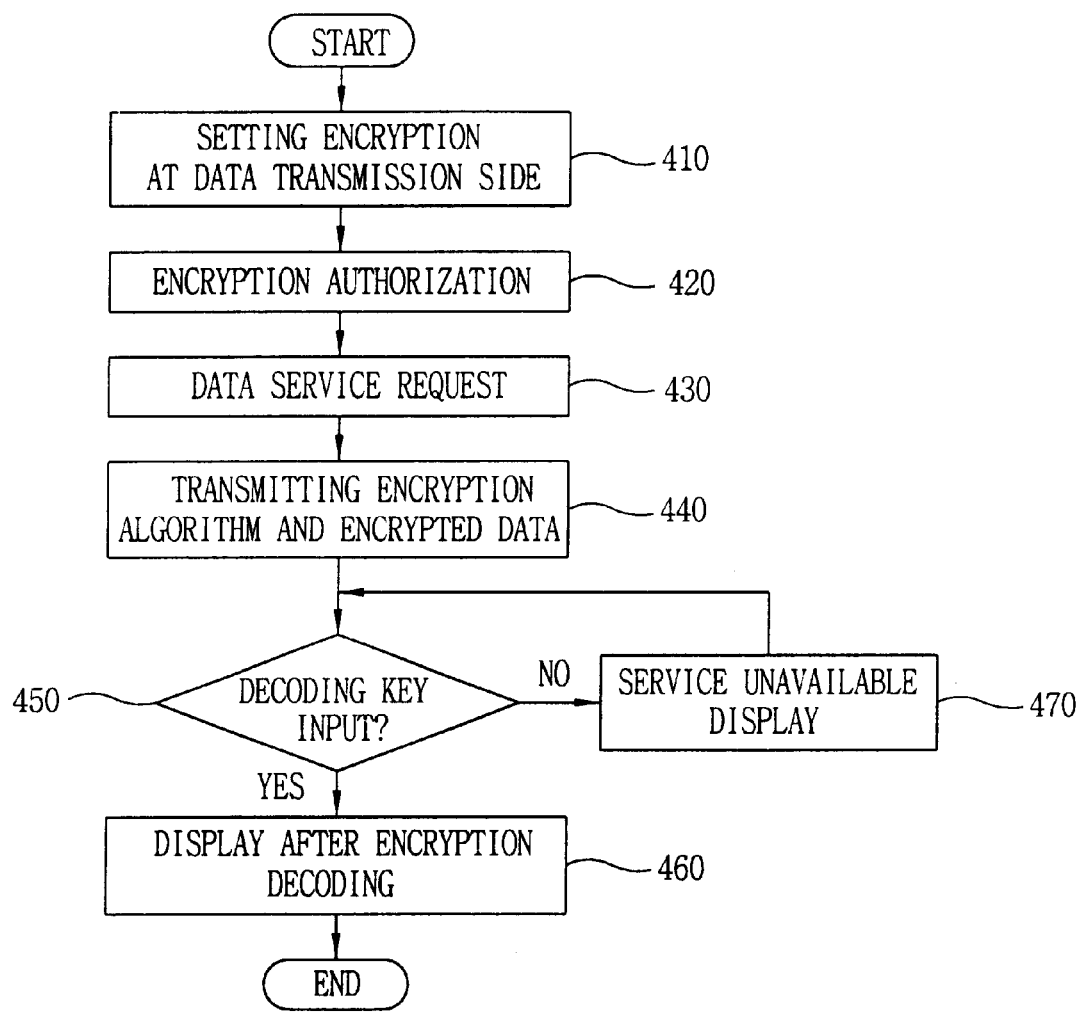
FIG. 4 is a flow chart illustrating a decoding process of an encrypted data according to the present invention.

FIG. 4 is a flow chart illustrating an embodiment of an encrypted data decoding process according to the present invention.

First, in Step 410, an encryption is set by a user with respect to a transmission node which provides a service. Namely, an encryption algorithm is transmitted. The encryption setting operation is performed by shifting a data which is service by a bit padding method in a rightward direction or a leftward direction by a certain bit or by adding a certain bit to the data. In other words, a certain data of character stream and bit stream, or a character, bit or byte of a byte stream are shifted by a shift instruction in a certain direction. A certain bit may be added to an original data and is transmitted to an algorithm for encrypting a certain data.

The above-described encryption setting operation is performed before a transmission path control or transmission process of a data is performed. Therefore, a data encryption is maintained on the transmission line, that is, for all portions on the network.

When the encryption is set at the transmission node, an encryption recognition is transferred to the receiving node which requested the encryption setting operation in Step 420. The above-described operation represents that an encryption is not preoccupied with another user at the transmission node, and the data of the transmission node is received based on an encryption key or password of a current user. If the encryption is predetermined at the transmission node, the requested access is denied, and a message that the encryption is preoccupied by another node is displayed.

In a state that the encryption is set at the transmission node, when a user requests a data service based on a certain receiving node in Step 430, the transmission node transmits an encryption algorithm and an encrypted data in Step 440. When the encryption algorithm and encrypted data are transmitted to the receiving node, in the receiving node, a message for inputting a decoding key, namely, a signal for decoding a certain encrypted data such as a password is displayed in Step 450. At this time, when the user inputs a password as a set decoding key, the encrypted data is decoded, and the display is started in Step 460.

In Step 450, if the decoding key is not inputted until a certain time is elapsed, the scrambled data is displayed in a state that the encrypted data is not decoded, and a service unavailable message is displayed in Step 470. Thereafter, the routine is returned to Step 450, and a message for inputting the password is displayed. The above-described processes are repeated until a proper decoding key is inputted.

Figure 5:
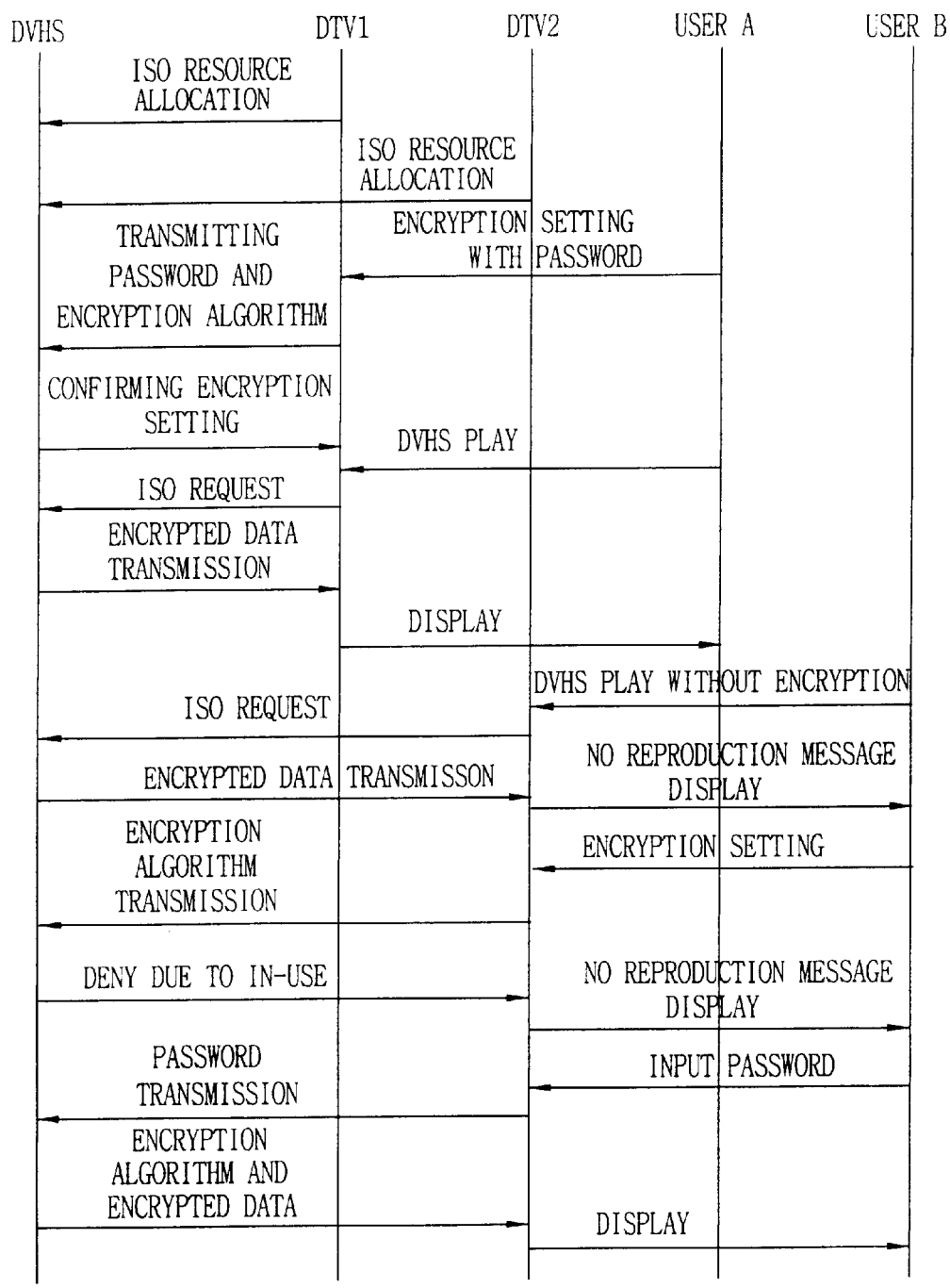
FIG. 5 is a view illustrating a display process based on a user's request via a data encryption and a process that when a non-authorized user requests a service according to the present invention.

The displaying process based on a user's request for a data encryption and the process for denying the service when a non-authorized user requests the service will be explained with reference to FIG. 5.

First, an isochronous transmission resource is allocated from a certain element for receiving a service, such as DTV1, DTV2, ..., DTVn to the DVHS. Thereafter, the suer A performs the DVHS using the DTV1. At this time, an encryption may be set based on a selective option. Namely, the encryption may be set so that an exclusive element or authorized elements receive the data to be transmitted from the DVHS using an encryption key. When the user A inputs an encryption key, an algorithm code which indicates a certain set encryption method and a password outputted from the DTV1 are transmitted from the DTV1 to the DVHS. As described above, the encryption may be performed based on a charging character or bit shift instruction based on the bit padding method. In the above-described methods, all the nodes are programmed by providing a certain code for thereby forming the table of FIG. 6. In the DVHS, the DTV1 is informed that the encryption is set. As a certain step for confirming the above-described operation, the state that the encryption is set may be displayed by character. When the user A requests a data service to the DVHS based on the DTV1, the DVHS transmits the encrypted data to the DTV1. The user A receives a requested data from the DTV1 and decodes the encrypted data using an encryption algorithm and displays a result of the decryption.

While the user A is receiving a certain data from the DTV1, a user B may wish to receive a certain data from the DTV2 connected with the DVHS. At this time, the user B may simply wish to receive the data in a state that the encryption is not set, or the user B may wish to receive the data by setting the encryption. First, when the user B requests a data by pressing the play button of the DTV2 in a state that the encryption is not set, the data encrypted by the user A is transmitted. This data may be received by the DTV2. However, the data is an encrypted data, so it is impossible to implement a normal reproducing operation. At this time, a character that the reproducing is unavailable may be displayed on the screen, and an input for inputting a decoding key such as a password may be displayed therein. When the user inputs a decoding key, the encrypted data is decrypted into an original data based on the DTV2 for thereby implementing a normal reproducing operation.

In a state that the user B does not recognize that the encryption is predetermined in the DVHS, a new password is inputted via the DTV2, and the encryption is set for receiving a data, and then an encryption algorithm is transmitted, since the encryption is predetermined by the user A in the DVHS, the encryption deny signal is transmitted to the DTV2. At this time, the message that the encryption is set on the DTV2 or a reproducing unavailable message may be displayed. The user B recognizes that the encryption of the DVHS is predetermined by another node and receives the decoding key from the user A based on an oral method and receives a data service using the decoding key as an input signal. It is obvious that the user B also sets an encryption to the DVHS based on the same manner and outputs the encrypted data to the designated DTV.

As described above, in the present invention, a user of a certain node sets an encryption at the data transmission side node based on the IEEE 1394 serial bus network and receives a service. It is possible to prevent a non-authorized user of other nodes from accessing and receiving a data without permission of the authorized user.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a data encryption method for an IEEE 1394 serial bus network, a data encryption method for an IEEE 1394 serial bus network, comprising the steps of:

requesting a private encryption at a data transmission node using a predetermined encryption algorithm at a data receiving node;

recognizing and confirming that the data transmission node set the private encryption requesting at the data receiving node;

transmitting an encrypted data at the data transmission node when the receiving node requests a service at the data transmission node; and decoding the encrypted data using a predetermined unencrypting key at the data receiving node.

2. The method of claim 1, wherein said encrypting setting operation is performed based on an IEEE 1394 serial bus network shared by all nodes by using a bit shift method and previously encoding the above-described method.

3. The method of claim 1 or 2, wherein said data transmission node requests a password input based on the encryption algorithm when a data receiving node requests a data transmission, and a service invalid message is displayed on a data receiving node when the password is not inputted.

4. The method of claim 1 or 2, wherein in a state that an encryption is set at the data transmission node by a data receiving node, if another data receiving node is to request an encryption at the data transmission node, an encryption deny message is displayed on said another node.

\* \* \* \* \*